Figure 1:
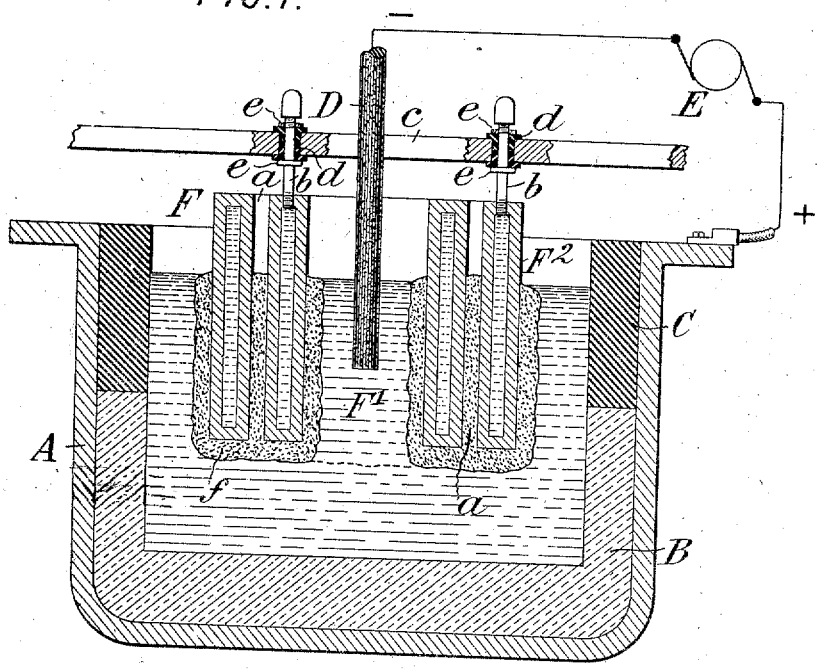

G. O. SEWARD & F. VON KÜGELGEN.

ELECTROLYTIC CELL.

APPLICATION FILED MAY 19, 1911.

Reissued July 25, 1911.

13,277.

WITNESSES.

T. F. Wallace

René Bruine

INVENTORS

George O. Seward and

Franz von Kügelgen

By Attorneys,

Fraser, Turner & Myers

UNITED STATES PATENT OFFICE.

GEORGE O. SEWARD, OF EAST ORANGE, NEW JERSEY, AND FRANZ VON KÜGELGEN, OF HOLCOMBS ROCK, VIRGINIA, ASSIGNORS TO VIRGINIA LABORATORY COMPANY, OF NEW YORK, N. Y., A CORPORATION OF NEW YORK.

ELECTROLYTIC CELL.

13,277. Specification of Reissued Letters Patent. Reissued July 25, 1911.

Original No. 842,256, dated January 29, 1907, Serial No. 269,942. Application for reissue filed May 19, 1911. Serial No. 628,347.

*To all whom it may concern:*

Be it known that we, GEORGE O. SEWARD, a citizen of the United States, residing in East Orange, in the county of Essex and State of New Jersey, and FRANZ VON KÜGELGEN, a subject of the German Emperor, residing at Holcombs Rock, in the county of Bedford and State of Virginia, have jointly invented certain new and useful Improvements in Electrolytic Cells, of which the following is a specification.

This invention provides an improved partition for use in the electrolysis of molten salts or wherever it may be desirable to interpose a non-conductive partition between the anode and cathode, so that the current is forced to deviate from a straight line between the electrodes. Such a partition is useful in separating the products of the electrolysis, particularly in separating the anode gases from the separated metal in the electrolytic production of metals which have a lower specific gravity than their electrolytes. It has been proposed to form such non-conductive partitions by chilling a layer of the electrolyte itself against a water-cooled metallic curtain, it being supposed that the thin layer of chilled salt would prevent the current passing through such curtain. It is not possible, however, to maintain such layer of chilled electrolyte of sufficient thickness and at a sufficiently low temperature to avoid its conducting a portion of the current from the molten electrolyte to the curtain. When such conduction occurs, the curtain acts as an intermediate electrode and becomes inefficient as a non-conductive partition. This result is most commonly encountered when using electrolytes of very low melting-point.

Our invention overcomes this difficulty by using a multiplicity of water-cooled curtains, two being usually sufficient, so supported that there is no electrical connection between them. By the provision of two or more such curtains we are able to insure that a sufficiently thick coating of chilled electrolyte shall be maintained in the space between the curtains, whereby they are effectively insulated from each other, or the space between the curtains may be packed with some insulating material.

The essential improvement provided by our invention lies in the provision of two (or more) curtains or partitions with an insulating mass or body maintained between them, whereby the transmission of current from one to the other is prevented, so that they cannot act as intermediate electrodes.

Figure 2:
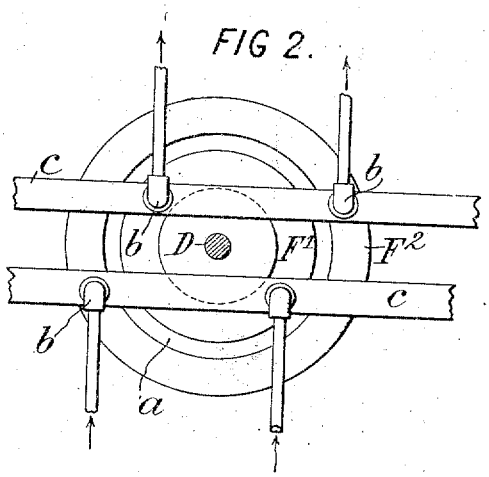
Figure 3:
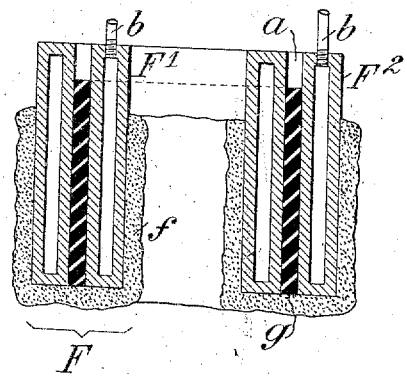

Figure 1 of the accompanying drawings shows an electrolytic cell embodying our invention in vertical mid-section. Fig. 2 is a plan of the conductive partition removed. Fig. 3 is a vertical section thereof, showing the space between the curtains packed with insulating material.

Referring to the drawings, let A designate the electrolytic vessel, which has preferably an insulating-lining B in its lower part and a conductive lining C, preferably of carbon, at its upper part, adapted to serve as the anode, although other constructions of cell and other arrangements of anode may be substituted. The vessel A is shown as circular, and in its center is arranged the cathode D. The position of anode and cathode may be transposed.

E is the dynamo or generator, whose terminals are connected, respectively, to the metallic vessel A and to the cathode D.

Between the anode and cathode is introduced the non-conductive partition F, which in the construction shown is made of two tubular cylindrical water-cooled curtains F′ and F², the former being arranged concentrically within the latter, leaving an annular space *a* of uniform width between them. The curtains F′ F² may be made of cast-iron cored out to form a water space or channel through which a circulation of water is maintained to cool them. The two curtains are necessarily insulated from one another. The curtains may be variously supported, one suitable construction being that shown, wherein they are suspended by pipes *b*, passing up through supporting-bars *c*, separated therefrom by insulating-bushings *d* and clamped thereto by nuts or collars *e e*. The pipes *b* thus serve both for the physical support of the curtains and for circulating the water which enters each curtain through one of these pipes and emerges through the other, which is located diametrically opposite, as shown in Fig. 2.

The non-conductive partition F projects down into the electrolyte, preferably to a greater depth than either the anode or cathode. By the circulation of the water the hollow curtains are so cooled that a layer of the molten salt constituting the electrolyte is congealed upon them, as indicated at *f*. The space *a*, being chilled from both sides, is kept filled with congealed salt, as shown in Fig. 1. It thus serves to effectively insulate one curtain from the other, and consequently makes the partition F as a whole an insulating or non-conducting partition.

Instead of leaving the space *a* open to be filled by the congealing of the salt therein, it may be filled or packed with insulating material, such as fire-clay or asbestos, as indicated at *g* in Fig. 3. In such case the salt layer *f* forms upon the outer surfaces of the water-cooled curtains and incloses the insulating-packing.

It is obvious that the mechanical details may be greatly varied and that our invention is not limited to the form or proportions of parts indicated, the embodiment shown and described being only one example of the application of our invention, although the one best adapted for use in the electrolysis of molten salts. Our invention is not limited in its application to the formation of the partition in circular or cylindrical form, although this form is preferable.

While we have herein referred to the hollow partition or curtain as "water-cooled", it is to be understood that any other refrigerant than water may be used, the use of liquid or gaseous refrigerants for such partitions having long been known (U. S. Patent to Graubau, No. 465,369, dated December 15, 1891). Hence our invention is not to be confined to the use of water as the refrigerating fluid.

We claim as our invention:—

1. A non-conductive partition for an electrolytic cell, comprising a plurality of separated water-cooled curtains insulated from one another, and the space between them filled with insulating material.

2. A non-conductive partition for an electrolytic cell, comprising a plurality of separated water-cooled curtains insulated from one another and adapted to maintain the space between them filled with a chilled and solidified layer of the electrolyte.

3. An electrolytic cell having a central and an outer annular electrode, and an intervening tubular non-conductive partition, comprising a plurality of tubular water-cooled curtains arranged concentrically one within another, insulated from one another, and having the space between them filled with insulating material.

4. A non-conductive partition for an electrolytic cell, comprising a plurality of separated cooled curtains insulated from one another, and the spaced between them filled with insulating material.

5. A non-conductive partition for an electrolytic cell, comprising a plurality of separated cooled curtains insulated from one another and adapted to maintain the space between them filled with a chilled and solidified layer of the electrolyte.

6. An electrolytic cell having a central and an outer annular electrode, and an intervening tubular non-conductive partition, comprising a plurality of tubular cooled curtains arranged concentrically one within another, insulated from one another, and having the space between them filled with insulating material.

In witness whereof we have hereunto signed our names in the presence of two subscribing witnesses.

GEORGE O. SEWARD.
FRANZ VON KÜGELGEN.

Witnesses to signature of George O. Seward:

T. F. WALLAGE,
WM. F. MARTINEZ.

Witnesses to signature of Franz von Kügelgen:

JNO. MOLEY,
A. E. HARVEY.